Jan. 14, 1947.  C. JOHANSEN  2,414,229
REVERSIBLE PROPELLER
Filed Sept. 17, 1943  2 Sheets-Sheet 1
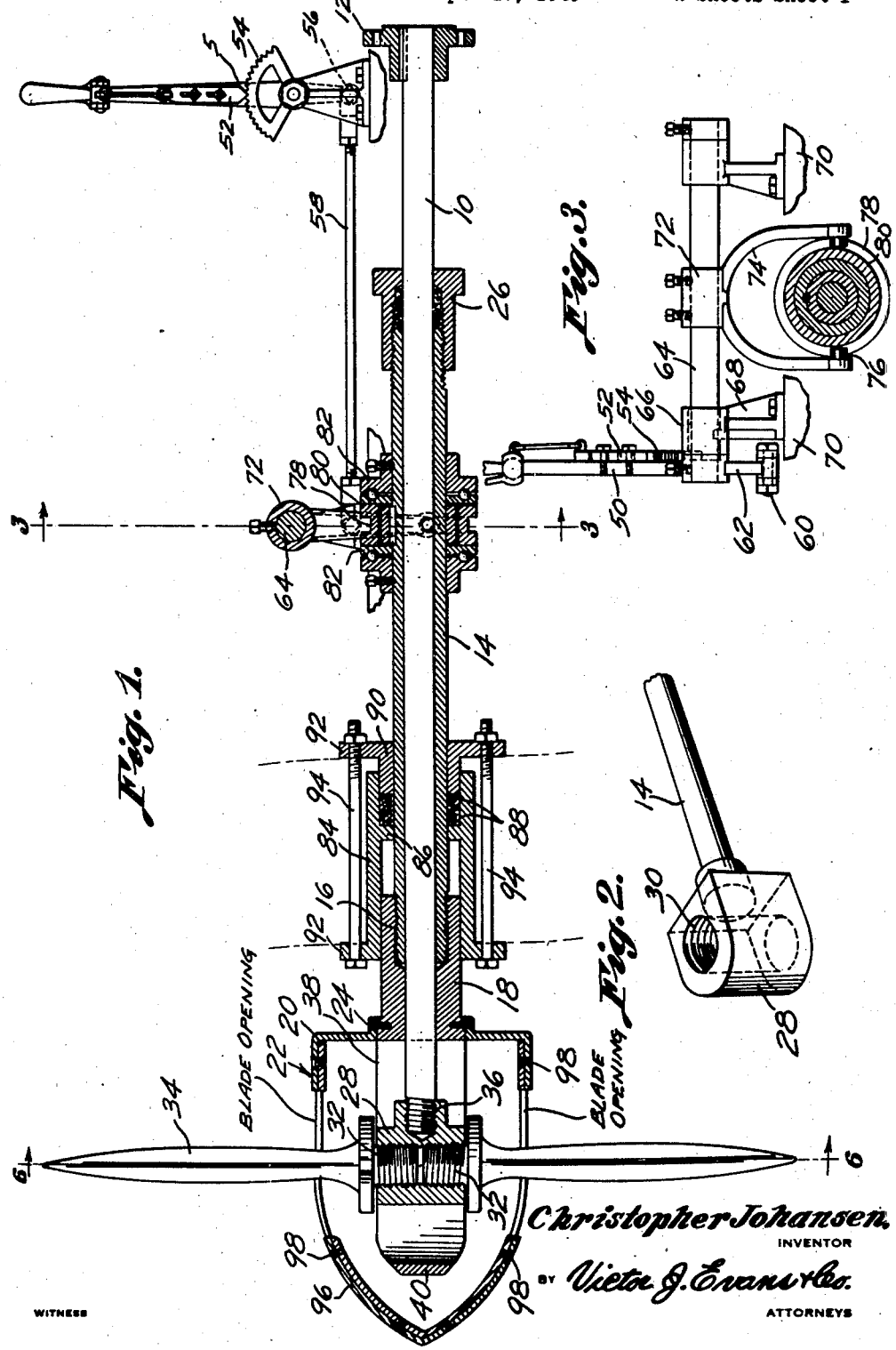
Christopher Johansen,
INVENTOR
BY Victor J. Evans & Co.
ATTORNEYS Jan. 14, 1947.  C. JOHANSEN  2,414,229
REVERSIBLE PROPELLER
Filed Sept. 17, 1943   2 Sheets-Sheet 2
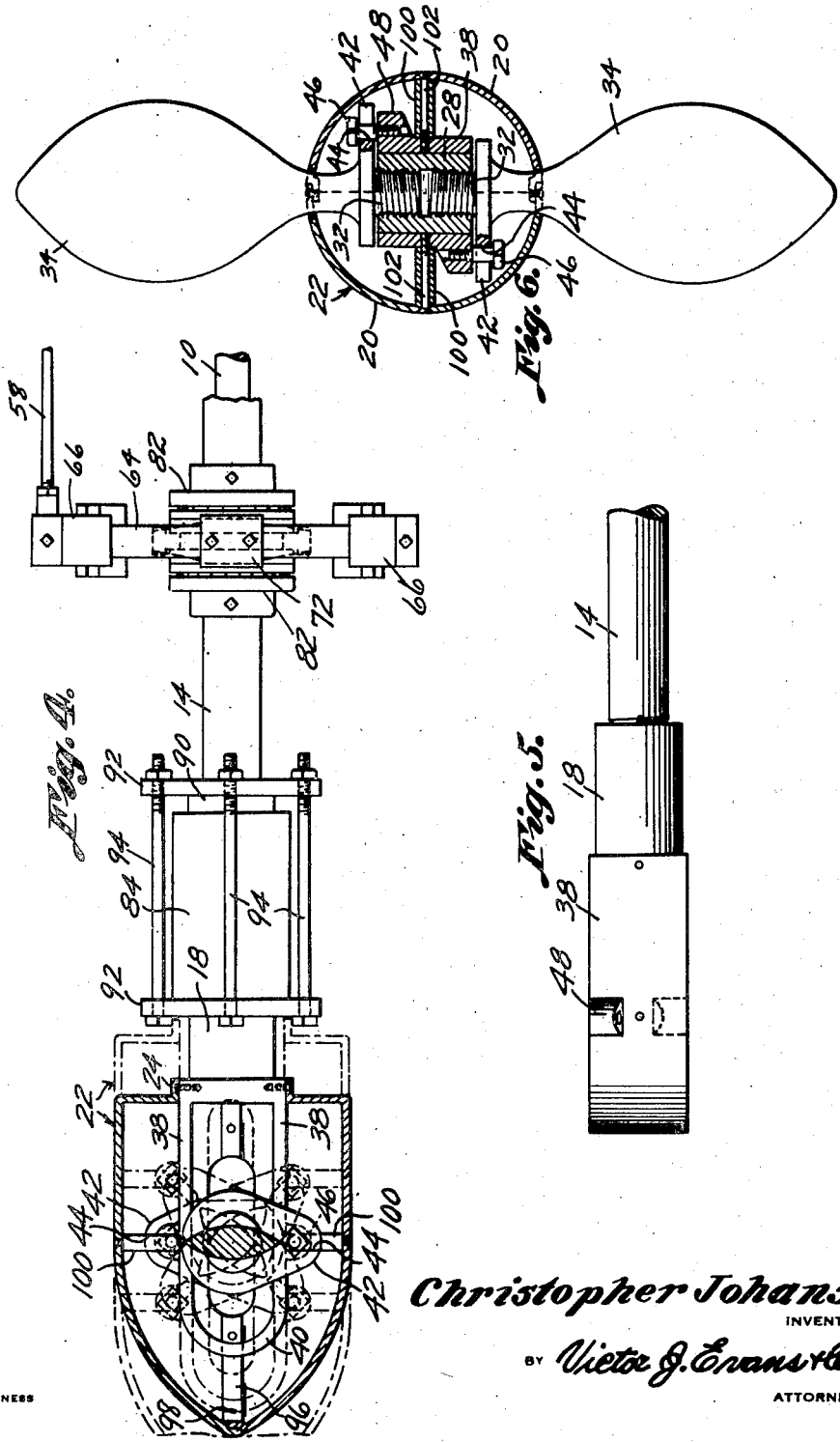
Christopher Johansen,
INVENTOR
BY Victor J. Evans & Co.
ATTORNEYS Patented Jan. 14, 1947

2,414,229

UNITED STATES PATENT OFFICE 2,414,229

REVERSIBLE PROPELLER

Christopher Johansen, Los Angeles, Calif.

Application September 17, 1943, Serial No. 502,821

2 Claims. (Cl. 170—163)

My invention relates to ship propellers, and has among its objects and advantages the provision of an improved reversible propeller.

In the accompanying drawings:

Figure 1 is a longitudinal sectional view of the propeller structure.

Figure 2 is a perspective view of a propeller blade mount.

Figure 3 is a view taken from the position indicated by line 3—3 of Figure 1.

Figure 4 is a top plan view of a part of the propeller structure, with a portion broken away.

Figure 5 is a detail view of a blade adjusting member, and

Figure 6 is a sectional view along the line 6—6 of Figure 1, but with the propeller blades illustrated in elevation.

In the embodiment of the invention selected for illustration, I make use of an engine driven shaft 10 provided with a coupling 12 for connection with the remainder of the shaft leading to the engine (not shown). This shaft extends loosely through a tubular shaft 14, and one end of the tubular shaft is threadedly connected at 16 with a body 18 to which are connected sections 20 of a propeller hub housing 22, as at 24. A packing nut 26 is threadedly connected with the other end of the tubular shaft 14 to establish a watertight joint between the two shafts 10 and 14.

To one end of the shaft 10 is threadedly connected a body 28 having a reversely threaded bore 30 for threaded connection with the stems 32 on two propeller blades 34. The shaft 10 is threadedly connected at 36 with the body 28.

The body 18 includes two parallel strap members 38 which are spaced but arranged face to face in parallelism with the shaft 14. The two members 38 are continuous with a curved length 40. Each blade 34 includes a short arm 42 lying close to the two members 38, see Figure 6. Slots 44 are provided in the arms 42 for the reception of pins 46 threaded into enlargements 48 formed on the members 38. Thus axial movement of the tubular shaft 14 relatively to the drive shaft 10 imparts turning movement to the propeller blades 34 for pitch changing and reversing purposes. One blade 34 is connected with one member 38, and the stems 34 rotate in the bore 30 when the blades 34 are turned about their axes.

Means for actuating the tubular shaft 14 comprises a lever 50 having a latch pawl 52 coacting with a quadrant 54. This lever is pivotally connected at 56 with a rod 58 pivotally connected at 60 with an arm 62 fixedly attached to a shaft 64, see Figure 3. This shaft is rotatably supported in bearings 66 mounted on pedestals 68 bolted to a support 70.

To the shaft 64 is fixedly connected a collar 72 having two bowed arms 74 provided with pins 76 riding in a circumferential groove 78 in a collar 80, see Figures 1 and 3. In Figure 1, the collar 80 is clamped between thrust bearings 82 mounted on the tubular shaft 14. Pivotal movement of the lever 50 rotates the shaft 64 for imparting oscillatory motion to the arms 74 and longitudinal movement of the tubular shaft 14 relatively to the drive shaft 10.

A portion of the cylindrical body 18 fits snugly inside one end of a sleeve 84, which sleeve is provided with an annular flange 86 fitting closely to the tubular shaft 14. Packing material 88 is provided in the sleeve 84 adjacent the flange 86, and a packing member 90 is mounted on the tubular shaft 14 for coaction with the flange 86 to establish a liquid tight connection. Both the sleeve 84 and the member 90 are provided with flanges 92 through which are extended bolts 94 for drawing the member 90 inwardly of the sleeve 84. The packing 88 prevents water from leaking in between the two shafts.

The sections 20 are overlapped at 96 and fixedly united by bolts 98. A spacing sleeve 100 is interposed between each section 20 and one member 38, and bolts 102 extend through the sections 20, the sleeves 100 and are threaded into the members 38.

Without further elaboration, the foregoing will so fully explain my invention, that others may, by applying current knowledge, readily adapt the same for use under various conditions of service.

I claim:

1. A reversible propeller comprising a drive shaft, propeller blades, a body on the end of the drive shaft having a reversely threaded transverse bore therethrough, the blades having stems loosely threaded into said bore in said body in axial alignment with each other to rotate about their longitudinal axes and for rotation as a unit with the drive shaft, a tubular shaft slidably mounted on the drive shaft, a cylindrical body on said tubular shaft having parallel connected strap members curved at their forward part, and said blades having lateral arms loosely connected with the strap members to reverse their screw through longitudinal shafting of the tubular shaft, means for shifting the tubular shaft, and a housing fixed to said cylindrical body having open parts through which the blades extend, the housing surrounding said first and second bodies.

2. A reversible propeller comprising a drive shaft, a body on the end of the drive shaft having reversely threaded bores therethrough, propeller blades having stems loosely threaded in said bores in axial alinement with each other to oscillate therein and for rotation as a unit with the drive shaft, a tubular member slidably mounted on said shaft and having two spaced arms engaging opposite sides of the body and of a width equal to that of the body and connected together at their outer ends, an outwardly extending arm carried by each propeller blade on opposite sides, a link connecting each arm to the spaced arms, a housing carried by and fixed at its rear end to the tubular member and surrounding the body and the spaced arms and having slots through which pass the shanks of the propeller blades, braces located between and secured to the spaced arms and the sides of the housing, and means for moving the tubular member on said shaft.

CHRISTOPHER JOHANSEN.